(12) United States Patent
Wang et al.

(10) Patent No.: US 7,172,124 B2
(45) Date of Patent: Feb. 6, 2007

(54) CAMERA-BASED BARCODE RECOGNITION

(75) Inventors: Jian Wang, Beijing (CN); Chunhui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 11/077,056

(22) Filed: Mar. 10, 2005

(65) Prior Publication Data
US 2006/0202039 A1 Sep. 14, 2006

(51) Int. Cl.
G06K 7/10 (2006.01)
G06K 19/06 (2006.01)

(52) U.S. Cl. .............................. 235/462.16; 235/462.01

(58) Field of Classification Search ............ 235/462.16, 235/462.19, 462.01, 462.24, 462.25, 462.29, 235/470
See application file for complete search history.

(56) References Cited

U.S. PATENT DOCUMENTS 5,682,030 A * 10/1997 Kubon ................... 235/462.25
5,969,325 A * 10/1999 Hecht et al. ............ 235/462.16
6,508,404 B2 * 1/2003 Hecht ..................... 235/462.08
6,978,937 B2 * 12/2005 Iwaguchi et al. ....... 235/462.16
2001/0006191 A1 * 7/2001 Hecht et al. ............ 235/462.16
2004/0099741 A1 * 5/2004 Dorai et al. ............ 235/462.08

* cited by examiner

Primary Examiner—Thien M. Le
Assistant Examiner—Edwyn Labaze
(74) Attorney, Agent, or Firm—Banner & Witcoff, Ltd.

(57) ABSTRACT

Embodiments of the invention relate to decoding encoded barcode information from a camera-captured image by generating a binarized sequence from the camera-captured image and decoding the encoded barcode information from the binarized sequence. The camera-captured image is transformed into a preprocessed grayscale image, reducing noise and enhancing contrast between bars and spaces in the preprocessed image. A barcode orientation is identified that is parallel to bars in the preprocessed image. A projected sequence is generated by projecting pixels of the preprocessed image along the barcode orientation. The binarized sequence is generated by applying a threshold to detected peaks and valleys of the projected sequence. A barcode-encoding sequence is generated, from the binarized sequence, in which each barcode bar module and each barcode space module is represented by a single respective bit in the barcode-encoding sequence. The barcode encoded information is extracted from the barcode-encoding sequence.

17 Claims, 9 Drawing Sheets

| $f(x-1,y-1)$ | $f(x,y-1)$ | $f(x+1,y-1)$ |
|---|---|---|
| $f(x-1,y)$ | $f(x,y)$ | $f(x+1,y)$ |
| $f(x-1,y+1)$ | $f(x,y+1)$ | $f(x+1,y+1)$ |

CAMERA-BASED BARCODE RECOGNITION

TECHNICAL FIELD

Embodiments of the invention relate to barcode recognition based on camera-captured barcode images.

BACKGROUND OF THE INVENTION

Use of barcodes is becoming more widespread, including use of barcodes for identifying many different types of things, including, but not limited to commercial goods, such as groceries, product packages of various types, printed reading material. A barcode typically assigns a unique identifier to a particular commodity. As a result automatic recognition of barcodes is very helpful when information about the commodity is to be retrieved from a database.

A barcode is a graphic identifier used to encode a set of digits or characters. A barcode comprises a series of bars and spaces, which may have different widths according to various encoding rules, such as the standard commodity barcode EAN13 barcode specification. FIG. 1 illustrates components of a typical prior art EAN-13 barcode.

An EAN-13 barcode can be divided into four main components: a number system 110, a manufacturer code 112, a product code 114, and a check digit 116. The first number-system digit is usually printed on the bottom of the left side of the start sentinel 100. The second number-system digit is printed as the first character of a six digits numbers group on the left-hand side below the barcode. The five-digit manufacturer code 112 is located on the left-hand side below the barcode. The first five digits on the right-hand side below the barcode is the product code 114. Finally, the check digit 116 is printed as the last digit on the right-hand side below the barcode.

The basic encoding scheme is as follows: a dark bar module in a barcode represents the number "1", whereas a light space module of the barcode represents the number "0". So, a binary number 1101 can be represents by a double-wide bar (11), followed by a single-wide space (0), and a single-wide bar (1). The corresponding barcode clip is illustrated in FIG. 2.

An EAN-13 barcode has the following physical structures: left-hand guard bars, also referred to as start sentinel 100, encoded as binary 101; center guard bar 102, encoded as binary 01010; right-hand guard bars, also referred to as end sentinel 104, encoded as binary 101.

An EAN-13 character is represented in 7 modules consisting of 2 bars and 2 spaces. No bar or space may be longer than 4 modules. Further encoding-scheme details may be found in an EAN-13 encoding table.

As mentioned above, use of barcodes for identifying commercial goods is now pervasive. A special-purpose device, such as laser or CCD scanner, is usually needed for traditional barcode-recognition methods. Such devices commonly comprise complex optical and mechanical subsystems. Their expensive prices and large form factors have precluded utilization of traditional barcode-recognition techniques in conjunction with mobile camera-equipped devices.

Image sensors and digital cameras are more popular than ever. Increasing numbers of mobile devices have built-in cameras. Robust barcode-recognition method techniques that would allow users of camera-equipped mobile devices to perform barcode recognition would be desirable. A mobile device with a built-in camera and real-time barcode-recognition ability would enable a user to capture, store, and acquire information more easily than is available via conventional information-gathering techniques.

SUMMARY OF THE INVENTION

Embodiments of the invention relate to decoding encoded barcode information from a camera-captured image by generating a binarized sequence from the camera-captured image and decoding the encoded barcode information from the binarized sequence. The camera-captured image is transformed into a preprocessed grayscale image, reducing noise and enhancing contrast between bars and spaces in the preprocessed image. A barcode orientation is identified that is parallel to bars in the preprocessed image. A projected sequence is generated by projecting pixels of the preprocessed image along the barcode orientation. The binarized sequence is generated by applying a threshold to detected peaks and valleys of the projected sequence. A barcode-encoding sequence is generated, from the binarized sequence, in which each barcode bar module and each barcode space module is represented by a single respective bit in the barcode-encoding sequence. The barcode encoded information is extracted from the barcode-encoding sequence.

Additional features and advantages of the invention will be apparent upon reviewing the following detailed description.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE INVENTION

I. Exemplary Operating Environment

Figure 1:
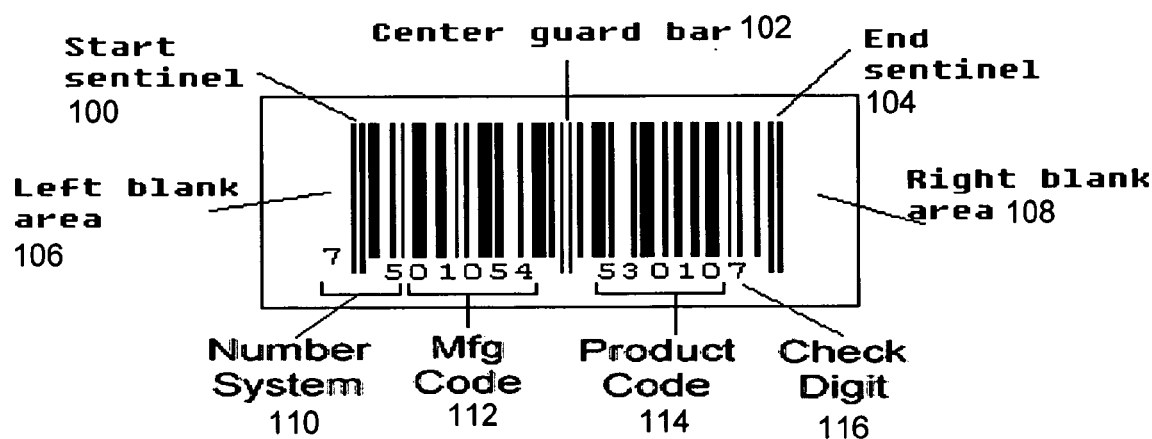
FIG. 1 illustrates components of a typical prior art EAN-13 barcode.
Figure 2:
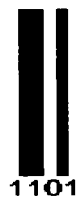
FIG. 2 shows prior art barcode bars and spaces encoding binary digits.
Figure 3:
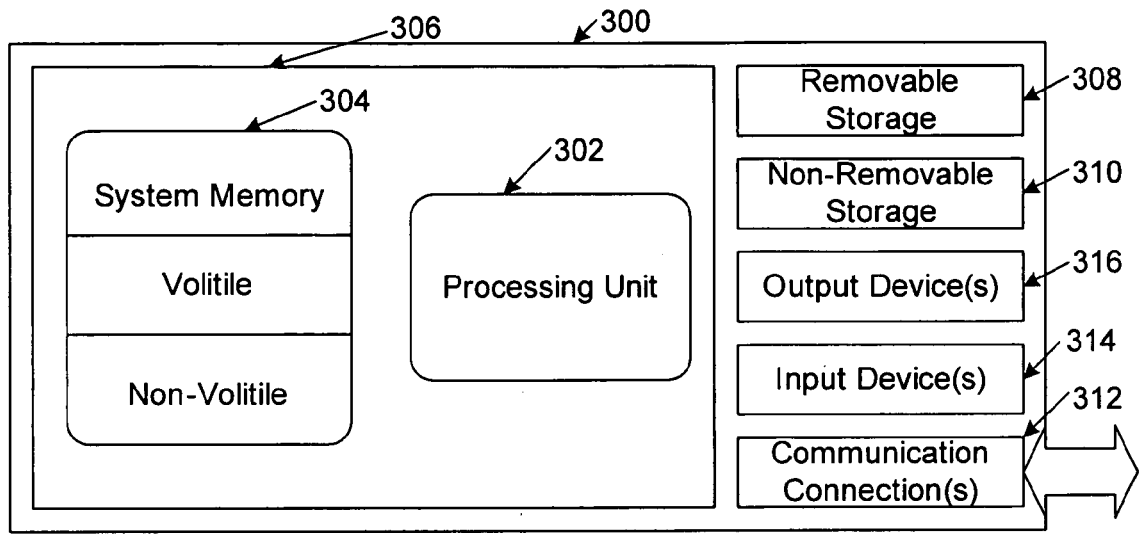
FIG. 3 is a schematic diagram showing an exemplary system for implementing the invention.

With reference to FIG. 3, an exemplary system for implementing the invention includes a computing device, such as computing device 300. In its most basic configuration, computing device 300 typically includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 3 by dashed line 306. Additionally, device 300 may also have additional features/functionality. For example, device 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 300. Any such computer storage media may be part of device 300.

Device 300 may also contain communications connection(s) 312 that allow the device to communicate with other devices. Communications connection(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 300 may also have input device(s) 314 such as keyboard, mouse, pen, voice input device, touch input device, etc. Output device(s) 316 such as a display, speakers, printer, etc. may also be included. All these devices are well known in the art and need not be discussed at length here.

In accordance with embodiments of the invention, a barcode image may be captured from a high end camera, such as a 4 mega-pixel digital camera, a low end camera, such as a 100 kilo-pixel PC camera, or a camera with any other suitable resolution. Embodiments of the invention may be implemented on various computer platforms, including, but not limited to, a personal computer, a Pocket PC, and any device with a built-in camera capable of capturing at least part of a barcode image. Sections ?—? describe techniques that apply to a complete barcode image. Sections ?—? describe techniques that apply to a series of partial barcode images captured by a camera with a field of view that is smaller than a barcode image.

II. Challenges Associated with Camera-Based Barcode Recognition

There are several potential challenges associated with automatically recognizing barcodes from camera-captured images including, but not limited to, low resolution of the captured barcode image, non-homogeneous ambient illumination, and the unknown perspective from which the barcode image has been captured. Any or all of these challenges may be present with respect to a particular attempt to recognized a barcode from a camera-captured image.

II.A. Low Resolution of Captured Barcode Image

Figure 7:
FIG. 7 is a better quality picture of the barcode of FIG. 8.
Figure 8:
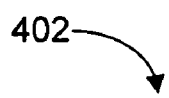
FIG. 8 illustrates the effect of camera noise on a captured barcode image.
Figure 8:
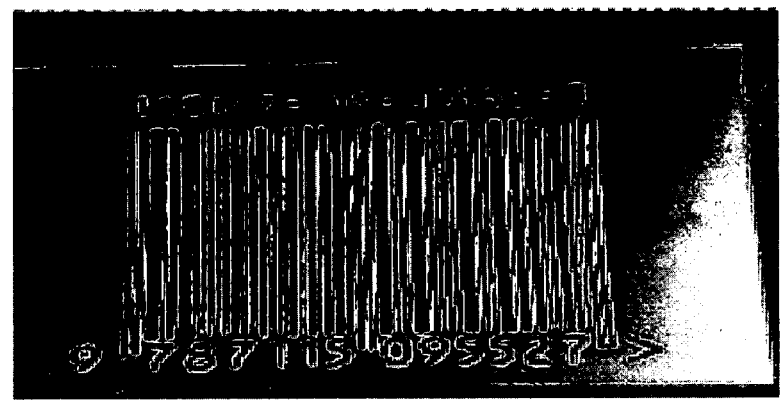

For a barcode image captured by a low resolution camera with low SNR (Signal-to-Noise Ratio), the contrast of bars and spaces in the captured image will be reduced, and the edges of bars in such an image will be vague. Also, because of noise, generating a black-and-white image becomes more difficult. FIG. 8 illustrates the effect of camera noise on a captured barcode image. FIG. 7 is a better quality picture of the barcode of FIG. 8.

II.B. Non-Homogeneous Ambient Illumination

Barcodes may be captured in different ambient illumination conditions. Environment illumination conditions will significantly affect the gray levels of bars and spaces in captured barcode images.

II.C. Perspective of Barcode Image

A robust barcode recognition system should allow a user to capture a barcode image from a wide range of angles (i.e., not just from an angle that is aligned with the bars and spaces of the barcode). Capturing barcode images from various perspectives significantly affects the barcode recognition process.

II.D. Assumptions Regarding Camera-Captured Images

The contrast of the barcode-image-capturing camera should be good enough to separate bars and spaces. In accordance with particular embodiments of the invention, the image resolution should be greater than 320×240 pixels. As will be apparent, increased resolution is desirable; with an image having a resolution of 640×480 pixels providing results that, under certain circumstance, may be better than the results obtained from a lower image resolution.

The center area of the captured-barcode image should be substantially completely occupied by the barcode. When a user wants to take a barcode picture for barcode recognition purposes, the user should use the barcode as the main focus object for the picture. If a captured image contains both a barcode image and an image of one or more other objects, the complexity of barcode-recognition processing would increase significantly. To simplify the problem of performing barcode recognition in real time, an assumption is made, in accordance with particular embodiments of the invention, that a square area in the center of the captured image is substantially fully occupied by the barcode. In accordance with particular embodiments of the invention, the size of the square area is 80×80 pixels in a 640×480-pixel image.

III. Barcode-Image Processing and Barcode Recognition

Figure 4:
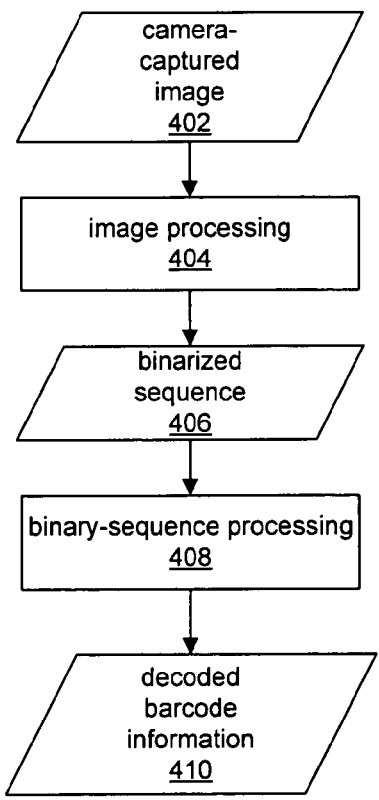
FIG. 4 is a flow diagram for a system that decodes encoded barcode information from a camera-captured image in accordance with embodiments of the invention.

FIG. 4 is a flow diagram for a system that decodes encoded barcode information from a camera-captured image in accordance with embodiments of the invention. Camera-captured image 402 is input to image-processing module 404, which outputs a binarized sequence 406. The binarized sequence 406 is input to binary-sequence-processing module 408, which outputs decoded barcode information 410. This architecture (i.e., the separation of barcode-image processing from barcode recognition) enables flexible expansion capabilities, such as to handle additional barcode-encoding schemes.

As mentioned above, FIG. 7 shows a barcode image captured by a high-resolution digital camera. An example of what a camera-captured image 402 might look like, when captured by a low-resolution camera, is depicted in FIG. 8.

III.A. Barcode-Image Processing

Figure 5:
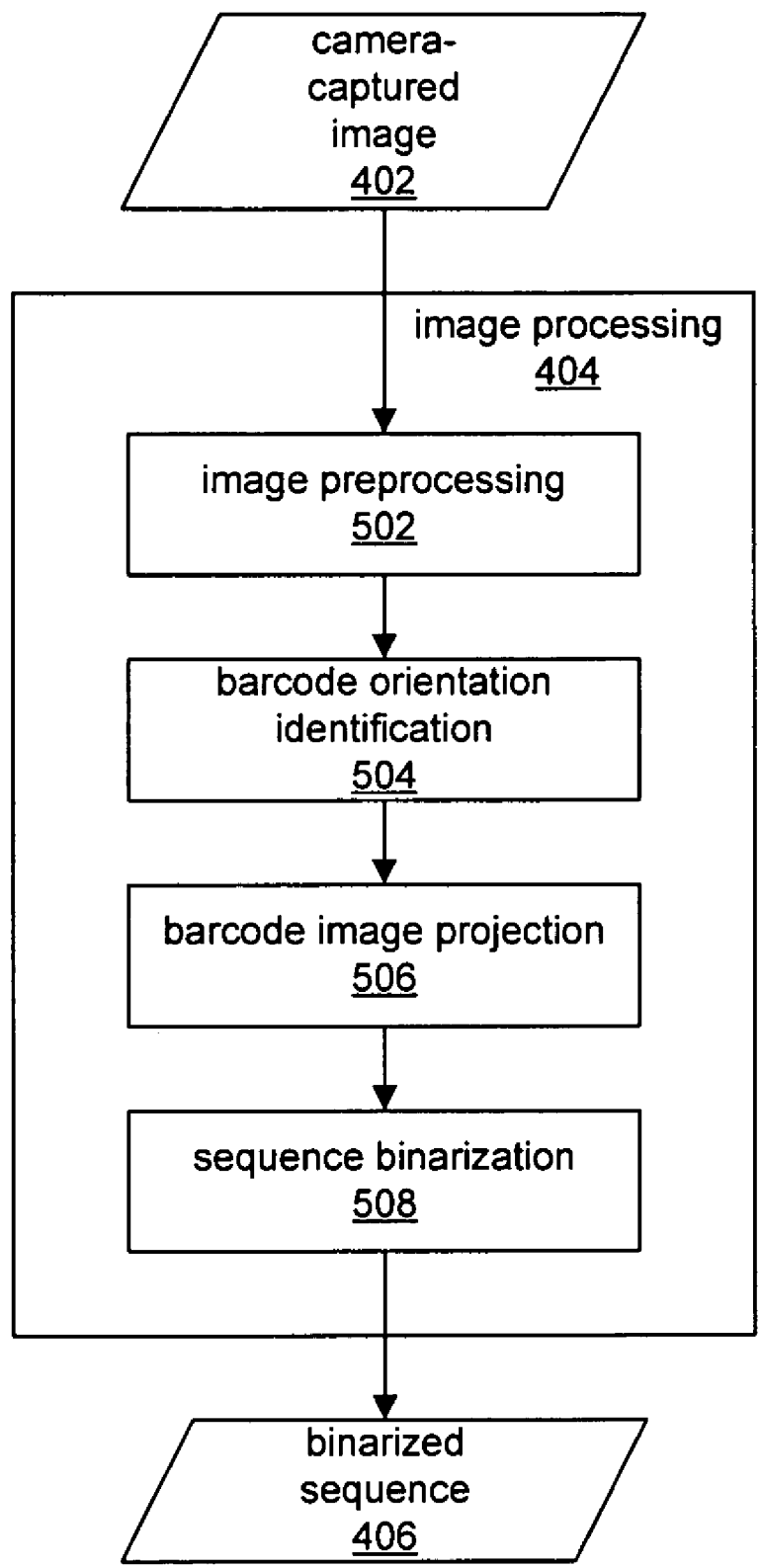
FIG. 5 shows sub-modules within image-processing module in accordance with embodiments of the invention.

FIG. 5 shows sub-modules within image-processing module 404 in accordance with embodiments of the invention. Camera-captured image 402 is input to image-preprocessing module 502.

III.A.1. Image Preprocessing

Figure 9:
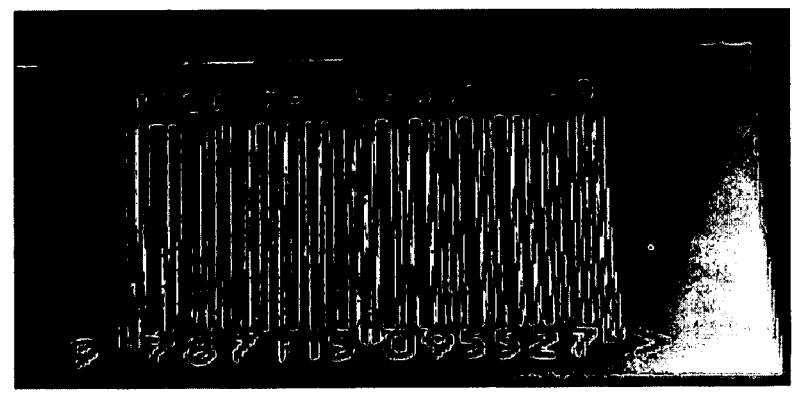
FIG. 9 depicts the barcode image from FIG. 8 with enhanced contrast as the result of having performed image equalization on the barcode image of FIG. 8.
Figure 10:
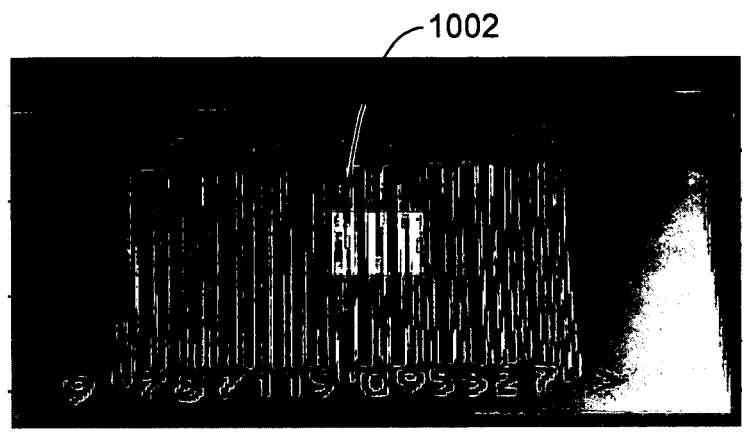
FIG. 10 shows an image-binarization area in accordance with embodiments of the invention.

Image-preprocessing module 502 performs image-processing techniques to: transform camera-captured image 402 from a color image into a grayscale image, reduce noise in the image, and enhance contrast between bars and spaces in the image. The image-preprocessing module's objective is to get an image which will facilitate barcode-orientation identification. In accordance with embodiments of the invention, image-preprocessing module 502 may perform image equalization to improve the contrast between bars and spaces in a barcode image. FIG. 9 depicts the barcode image from FIG. 8 with enhanced contrast as the result of having performed image equalization on the barcode image of FIG. 8. Image-preprocessing module 502 may also perform image binarization based on a threshold gray level. Image binarization may be performed on an image-binarization area, which may be rectangular and located relatively close to the center of the barcode image, as is the case for image-binarization area 1002, which is shown a white rectangle in FIG. 10.

III.A.2. Barcode Orientation Identification

Barcode-orientation-identification module 504 identifies a barcode orientation, which is defined, in this context, as a direction parallel to the bars of the barcode image.

Due to the low resolution of a low-end camera, the edges of bars and spaces in the image may be blurry. In accordance with embodiments of the invention, the fact that a bar's height is much greater than the bar's width is used for determining barcode-image orientation. A barcode image will have the largest mean value when it is projected in a direction that is parallel to the bars. This characteristic is used in the following steps for identifying the barcode orientation:

$I_{bc}$ is a binarized result of the image-binarization area 1002 of the preprocessed image.

The image $I_{bc}$ is projected at angles from 0 to 179 degrees. In accordance with embodiments of the invention, a variable step method may be used to accelerate the projection from 0 to 179 degree.

The mean value is calculated at each projection angle, $M_{[i]}$, where, $i=[0,1, \ldots 179]$.

Barcode orientation $\theta = \{\alpha | M_{[\alpha]} > M_{[i]}, i=[0,1, \ldots 179], i \neq \alpha\}$

III.A.3. Barcode Projection

Figure 11:
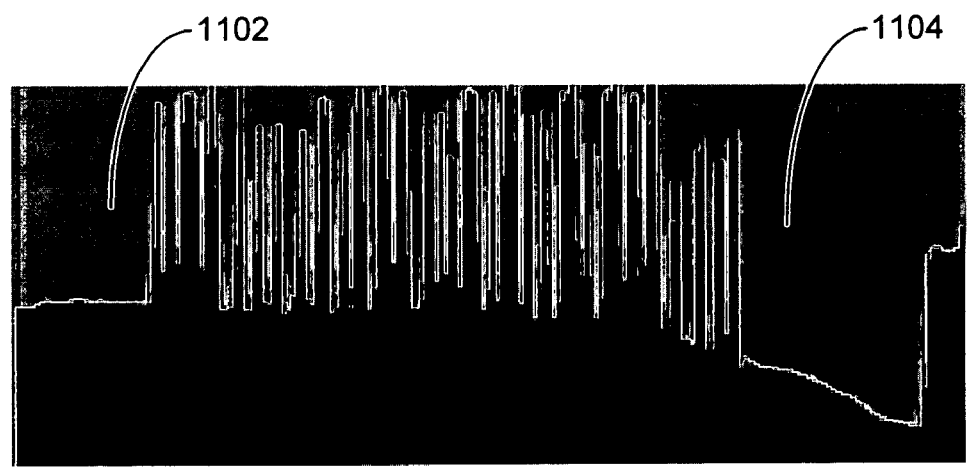
FIG. 11 depicts a projected sequence generated by projecting pixels of the barcode image along the barcode orientation in accordance with embodiments of the invention.

With the barcode orientation identified, barcode-image-projection module 506 projects the pixels of the barcode image along the identified orientation. Hence, a sinusoidal-shape-like sequence, such as is shown in FIG. 11, may be obtained.

According to the barcode orientation $\theta$, an oriented window OW may be computed. The oriented window may be centered at image center (Xc,Yc) in pixel coordinates. The window size is l×w, where w is a constant value, l can be calculated as follows:

$$l = \sqrt{(W - w \times \sin(\theta))^2 + (H - w \times \cos(\theta))^2}$$

Where, W and H are the width and height of the image, and $\theta$ is the barcode orientation.

Figure 12:
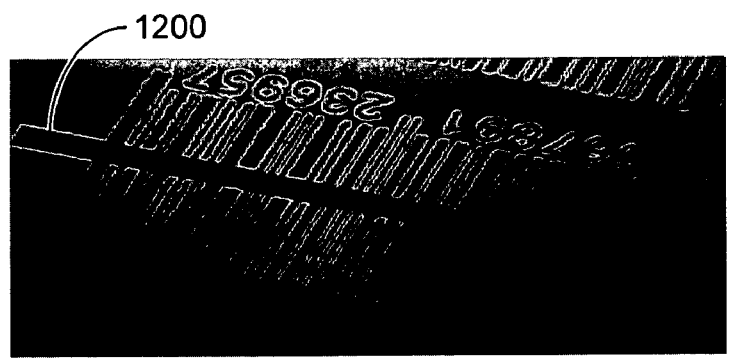
FIG. 12 depicts a strip-like oriented window in accordance with embodiments of the invention.

Because barcode recognition depends significantly upon the proportional relationship between bars and spaces, the effect of distortion involved in barcode projection can be significant. If a larger w is chosen, the quantification process will produce a larger error. If a smaller w is chosen, then shorter bars are used, which would lower the ability to reduce noise. In accordance with embodiments of the invention, the constant value w may be set to 30 pixels. This results in a strip-like oriented window 1200 as shown in FIG. 12.

The image within the oriented window 1200, is projected along angle $\theta$ to obtain a one dimension sequence $Sq_{[0]}, \ldots, Sq_{[l-1]}$ in pixel resolution. This sequence can be used to detect valid projected sequence area. A characteristic of barcodes is that there will be two blank areas, which are at least 9 modules wide, at both ends of a barcode. Hence, in accordance with the projected value of the one dimension projected sequence of a barcode, the left and right blank areas can be detected by comparing various potential left and right blank areas with barcode area.

Figure 13:
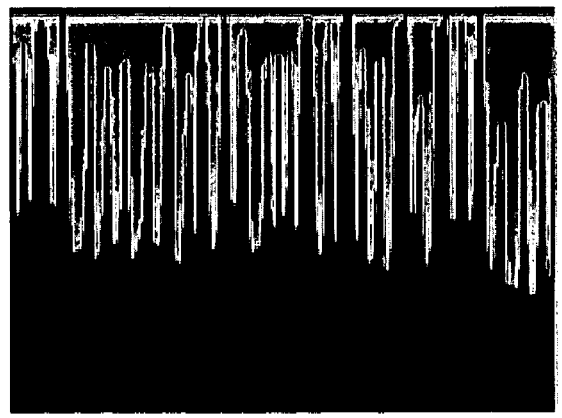
FIG. 13 depicts a projected barcode image in accordance with embodiments of the invention.

A characteristic of barcodes is that there will be blank areas, which are at least 9 modules wide, to the left and to the right of the barcode. In accordance with embodiments of the invention, the blank areas are searched for by starting from the sequence center and proceeding toward both the left-blank area and the right-blank area until the two blank areas are found. A rule that may be used to detect blank areas is that no singular sharp peak (i.e., a projected bar) may appear within a continuous area of a certain length. In this way, the barcode sequence endings El and Er may be found. El is depicted at 1102, and Er is depicted at 1104 in FIG. 11. The subsequence outside of the two endings may then be ignored, which will result in a projected barcode image as shown in FIG. 13. In FIGS. 11 and 13, the horizontal axis represents the position in the projected sequence (in pixels), and the vertical axis represents the projected value (in pixels) of a particular bar or space.

From El to Er, the following formula is used to re-sample a new sequence Sq' in sub-pixels resolution (i.e., a greater resolution than at the pixel level).

$$Sq'_{[i]} = \frac{1}{w}\sum_{j=0}^{w-1}(255 - I'(fu, fv)), \quad i = [0, 1 \ldots 4 \times (El - Er) - 1]$$

Where, I'(fu,fv) is the bilinear interpolated value from the original image I.

$$fu = Xc + (i \cdot St + El - l/2)\cos\theta + (j - w/2)\sin\theta$$

$$fv = Yc + (i \cdot St + El - l/2)\sin\theta + (j - w/2)\cos\theta$$

Thus, a projected sequence with 0.25-pixel precision Sq' is obtained, and then the final sequence Sq may be generated after performing Gaussian smoothing filtering to get rid of spurs.

III.A.4. Sequence Binarization

Sequence-binarization module 508 detects ridges and valleys, R and V, respectively, in Sq, and the numbers of ridges and valleys are noted as Rn and Vn, respectively.

Then, a threshold method may be used to binarize Sq to generate the initial barcode binary sequence Bsq, also referred to as the binarized sequence 406.

For each valley and its next valley, $s=[V_{[k]},V_{[k+1]}]$ is a closed interval, where k is from 0 to Rn. Thus, $$Bsq_{[s]} = \begin{cases} 1, & Sq_{[s]} > \lambda_{[k]} \\ 0, & Sq_{[s]} < \lambda_{[k]} \end{cases}$$

Where, $$\lambda_{[k]} = Sq_{[R_{[k]}]} - \min(Sq_{[R_{[k]}]} - Sq_{[V_{[k-1]}]}, Sq_{[R_{[k]}]} - Sq_{[V_{[k]}]}) \times \alpha;$$

α is a parameter tuned by experiment. In accordance with embodiments of the invention, α=0.5.

III.B. Binary-Sequence Processing

Figures 6, 20:
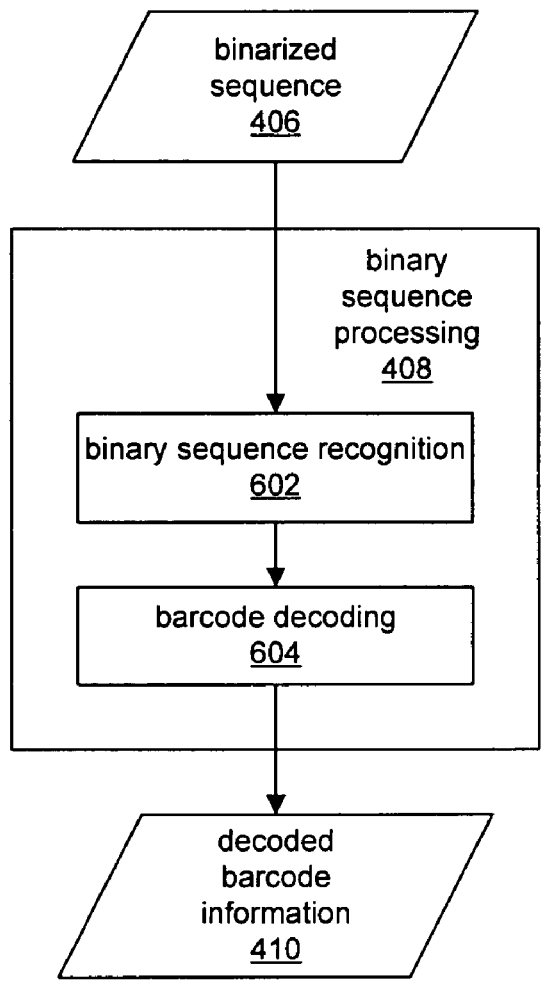
FIG. 6 shows sub-modules within binary-sequence-processing module 408 in accordance with embodiments of the invention.
FIG. 20 shows the position relationship of pixels used in the Sobel method in accordance with embodiments of the invention.

FIG. 6 shows sub-modules within binary-sequence-processing module 408 in accordance with embodiments of the invention. Binarized-sequence 406 is input to binary-sequence-recognition module 602.

III.B.1. Binary Sequence Recognition

The binarized sequence 406 is the projected sequence of the barcode image resampled in sub-pixel resolution. So, for example each bar or space value is repeated multiple times (e.g. 4 times) resulting in a binarized sequence such as 11110000 . . . 1111. The binary-sequence-processing module 408 processes the binarized sequence 406 to generate a barcode-encoding sequence, which is a bit sequence in which a value of 1 represents a bar module, and a value of 0 represents a space module. For example, for the EAN-13 barcode with 95 modules, the barcode encoding sequence is a sequence with 95 bits.

Based on the count of ridges and valleys, the most possible barcode type and total number of modules may be estimated. Then the width of a barcode module may be determined based on the number of bits used to represent a basic bar or space. The width of a barcode module may then be used to generate the barcode-encoding sequence from the binarized sequence 406.

The binarized sequence 406 is measured as a nearest barcode encoding sequence based on barcode encoding rules and characters of the binary sequence. Binary-sequence-recognition module 602 extracts 1's and 0's from the binarized sequence. Then the barcode-encoding sequence may be computed.

Based on the numbers of ridges and valleys, a most-likely barcode type may be selected.

The maximum of continuous zeros MaxZero and of continuous ones MaxOne in the binarized sequence Bsq is found.

MaxZero, MaxZero, and the length of Bsq may be used for estimating the single-bar-module width $\hat{W}_B$ and single-space-module width $\hat{W}_S$.

From the beginning of Bsq to the end, the number of continuous ones $N_O$ and the number of continuous zeros $N_Z$ is counted to calculate the number of bar modules $N_{BM}$ and space modules $N_{SM}$ as follows:

$$N_{BM} = N_O/\hat{W}_B + 0.5$$

$$N_{SM} = N_Z/\hat{W}_S + 0.5$$

Figure 14:
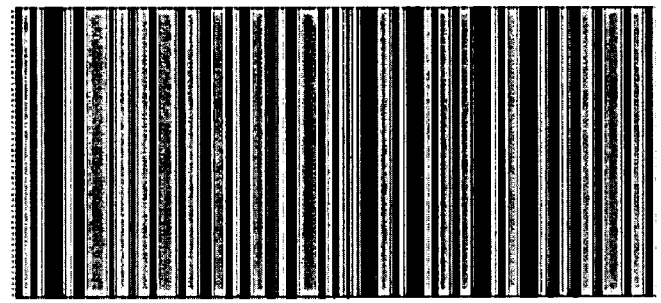
FIG. 14 show a graphical depiction of a barcode-encoding sequence in accordance with embodiments of the invention.

Based on the foregoing calculations, the barcode-encoding sequence, a graphical depiction of which is shown in FIG. 14, may be obtained.

Also, some properties of specific types of barcodes can help with recognition of the sequence. For example, for UPC-series barcodes, two bars and two spaces construct one digit, and one barcode digit is represented by seven basic modules. Hence, the binarized sequence Bsq may be separated into 15 distinct areas. Each area may then be measured separately. This method can reduce the global measurement error to handle the perspective distortion.

III.B.2. Barcode Decoding

Figure 15:
FIG. 15 depicts decoded barcode information in accordance with embodiments of the invention.

The barcode-decoding module 604 extracts the encoded information from the barcode-encoding sequence and verifies the extracted information. For example for EAN-13 barcodes, the 95 bits of module information can be decoded and verified according the EAN-13 coding rules. In this way, the numerical information encoded in the barcode is decoded, as depicted by decoded barcode information 410 in FIGS. 4 and 6 and by the numbers that appear at the bottom of the barcode image shown in FIG. 15.

IV. Small Field-of-View Camera

Barcode-recognition opportunities for a user of a device equipped with a small field-of-view (FOV) camera (e.g., a small-FOV camera-equipped digital pen or computer mouse) may occur in many situations, such as at the grocery store, book store, and other retail establishments, where the user may capture, store, and use the recognized barcode information to obtain product information.

For a barcode image captured by a camera with a FOV (Field of View) that is larger than the area of a barcode, the techniques described above may be used to recognize barcode. For a device with a small FOV camera, a series of images may be captured by the small-FOV camera while a user is scanning a barcode from one side to the other.

Embodiments of the invention are based on small FOV cameras having different FOV sizes: 32×32 pixels and 128×100 pixels. Their data transfer speed is up to 70 frames per second. The width of a barcode module in the image is about 3–5 pixels, and the actual physical width of a module is 0.33 mm. Theoretically, the scan speed is 70 mm/s, but considering unstable data transfer speed and scanning operation, a scan speed that works well is approximately 40 mm/s.

Figure 16:
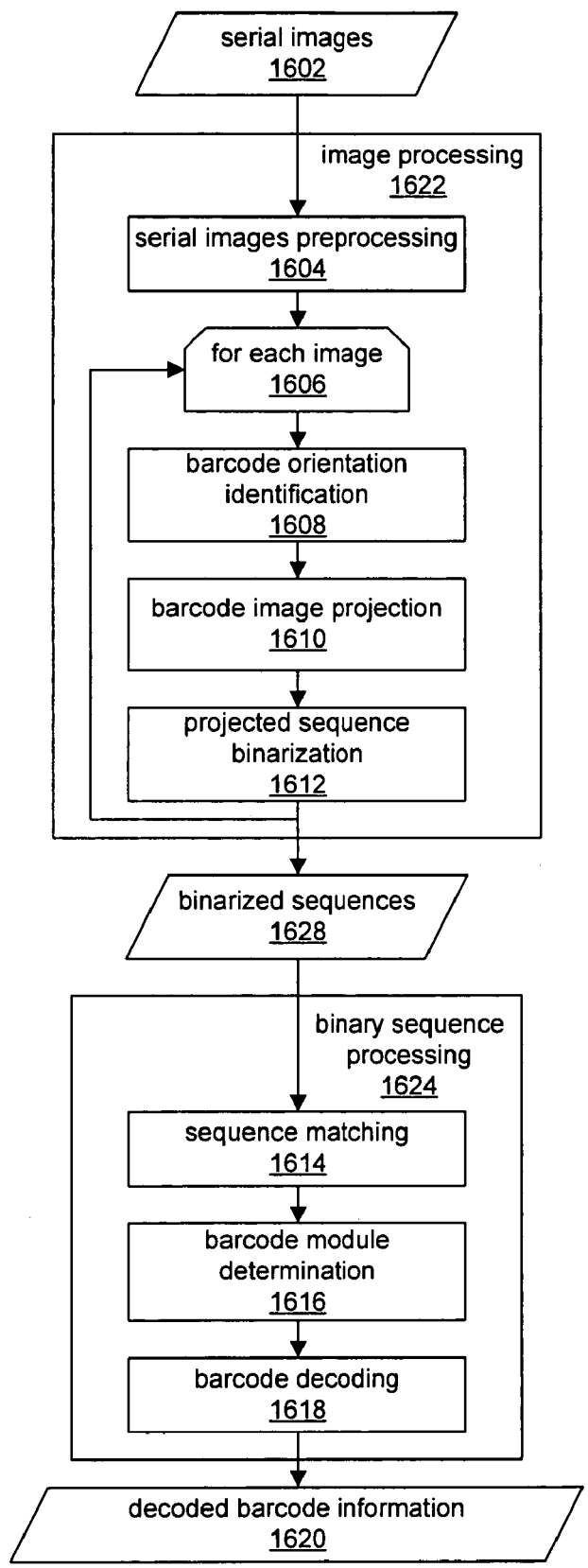
FIG. 16 is a flow diagram that shows a system that decodes encoded barcode information from a series of barcode images captured by a small-FOV camera in accordance with embodiments of the invention.

FIG. 16 is a flow diagram that shows a system that decodes encoded barcode information from a series of barcode images captured by a small-FOV camera in accordance with embodiments of the invention. Serial images 1602 are input to the image-processing module 1622, which generates binarized sequences 1628. A binary-sequence-processing module 1624 generates decoded barcode information based on the binarized sequences 1628. Image-processing module 1622 and binary-sequence-processing module 1624 both contain sub-modules, which are discussed below.

IV.A. Serial Images Preprocessing

The main goal of the serial-images-preprocessing module 1604 is to use image processing techniques to remove the non-uniform illumination effect, reduce noise, and enhance the contrast of bars and spaces of a series of barcode images.

First, in order to enhance the contrast of an image, the gray value of each frame is stretched between 0 and 255 with following formula:

$$I_S(i, j) = 255 \cdot \frac{I(i, j) - G_{\min}}{G_{\max} - G_{\min}} \tag{1}$$

Where, I(ij) is a pixel's gray value and $G_{min}$ and $G_{max}$ are minimum and maximum gray values respectively in image I.

According to the gray-value information of each frame, a maximum gray-value frame and a minimum gray-value frame $I_{max}(i,j)$, $I_{min}(i,j)$ are obtained, in which each pixel's gray value is the maximum gray value and the minimum gray value, respectively, in the image sequence. Each pixel of a frame is processed according the following equation by using maximum and minimum gray value information frames, $$I_N(i, j) = 255 \cdot \frac{I_{\max}(i, j) - I(i, j)}{I_{\max}(i, j) - I_{\min}(i, j)} \tag{2}$$

Where, I(ij) is a pixel's gray value, $I_{max}(i,j)$ is the maximum gray frame and $I_{min}(i,j)$ is the minimum image frame.

Thus, the noise of the captured image, which may result from spurious dots on the barcode itself or on the image sensor, gets filtered well. This efficient preprocessing technique significantly reduces the influence of noise. After preprocessing, the contrast between bars and spaces is significantly enhanced, and the image's coding scheme has been reversed such that bigger numerical values represent the bars and smaller numerical values represent the background or spaces.

Figure 17:
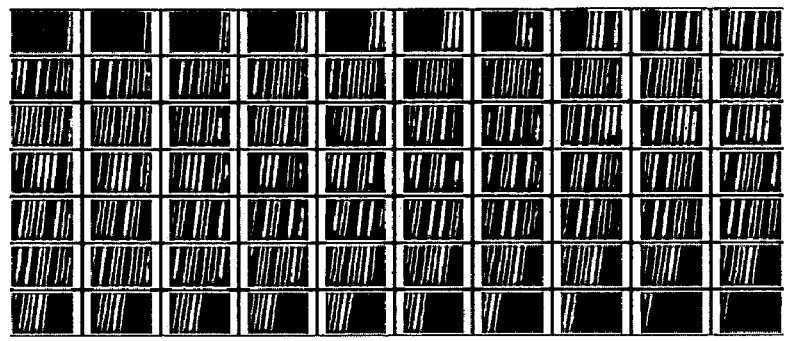
FIG. 17 shows a series of images captured by a small-FOV camera.
Figure 18:
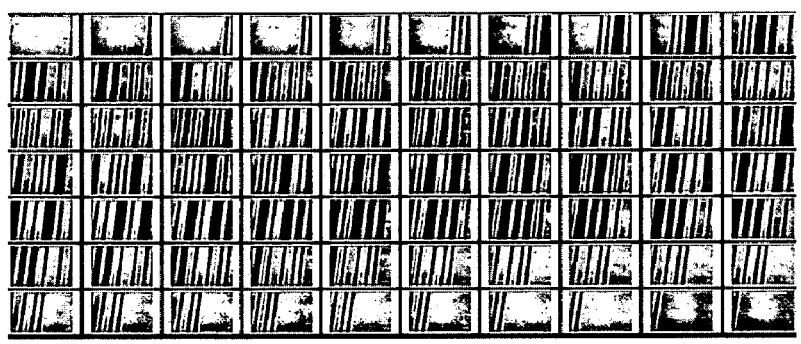
FIG. 18 shows the same series of images with enhanced contrast provided by the serial-images preprocessing module in accordance with embodiments of the invention.

FIG. 17 shows a series of images captured by a small-FOV camera. FIG. 18 shows the same series of images with enhanced contrast provided by the serial-images preprocessing module 1604.

IV.B. Barcode Orientation Identification

A direction that is parallel to the bars and spaces of a barcode is defined as the barcode orientation. The barcode-orientation-identification module 1608 estimates the orientation of the barcode via a gradient-orientation method. In accordance with embodiments of the invention, a Sobel operator with a 3×3 mask (for a 32×32-pixel image) or 6×6 interleaved mask (for a 128×100-pixel image) may be used to calculate each pixel's gradient. The Sobel formula is set forth in the following expressions $\Delta xf(x, y)=f(x-1, y+1)+2f(x, y+1)+f(x+1, y+1)-f(x-1, y-1)-2f(x,y-1)-f(x+1, y-1)$ $\Delta yf(x, y)=f(x-1, y-1)+2f(x-1, y)+f(x-1, y+1)-f(x+1, y-1)-2f(x+1, y)-f(x+1, y+1)$ $G[f(x, y)]=|\Delta xf(x, y)|+|\Delta yf(x, y)|$ The position relationship of pixels used in the Sobel method is shown in FIG. 20. The Sobel operator is well known in the art and does not need to be discussed in detail here. The gradient orientation of each pixel is computed as follows:

$$O(i, j)=\arctan(\Delta yf(x, y)/\Delta xf(x, y)) \tag{3}$$

Figure 19:
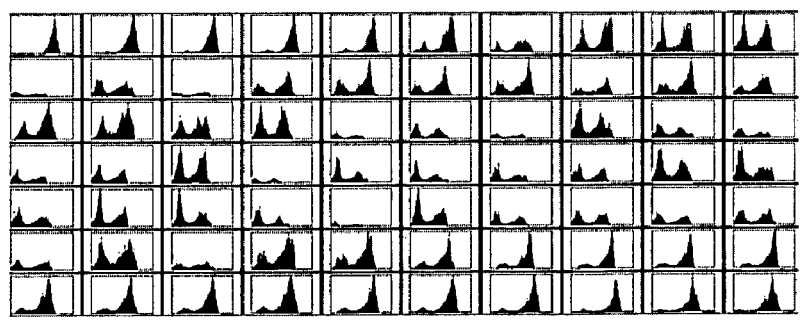
FIG. 19 shows histograms of the gradient of pixels in accordance with embodiments of the invention.

Where, O(i, j) is the gradient orientation of pixel (i,j), represented in radians. FIG. 19 shows histograms of the gradient of pixels.

Consequently, the statistical histogram of orientation of each frame is calculated. The sequence from the statistical histogram is smoothed by Gaussian smoothing filtering, and then the orientation of the densest area is denoted as the orientation of the barcode for the current frame.

The effective start frame and end frame are determined according to a percentage of the densest area compared to the whole area of each frame histogram. Then image projection along the barcode orientation will be performed on each valid image.

IV.C. Image Projection

The barcode-image-projection module 1610 generates a sinusoidal-shape liked sequence by projecting a barcode frame along its orientation.

The barcode orientation is denoted as the projection direction. A line with the direction perpendicular to the barcode orientation is denoted as the base line. The image is projected to the base line along the barcode orientation. Here, to improve the performance of image matching, the image is projected with sub pixel (such as 0.1 pixels) precision (i.e., greater precision than at the pixel level). Along the base line direction, bi-linear interpolation is used to re-sample pixels, and the gray value of each resample value along the projection direction is accumulated as a projected value. Furthermore, the projected value is normalized according to the projection length in the frame. Consequently, a gray sequence is produced that represents the barcode information in one dimension. Then, Gaussian filtering is used to obtain a relative smooth gray sequence.

IV.D. Projected Sequence Binarization

In accordance with embodiments of the invention, the projected-sequence-binarization module 1612 uses maximum group variance to segment the gray value sequence into a binary sequence, which contains the bars-and-spaces information. This method is derived from the least-square theory. The basic idea of the method is to determine the threshold value of an image by its histogram when two groups have maximum variance. When the gray value is bigger than the threshold, then the gray value is set to 1, which represents a bar. Otherwise, the gray value is set to 0, which represents a space.

As shown at 1606 in FIG. 16, barcode-orientation-identification module 1608, barcode-image-projection module 1610, and projected-sequence-binarization module 1612 iterate on each of the serial images 1602. In this way, the image-processing module 1622 generates binarized sequences 1628.

IV.E. Sequence Matching

Sequence-matching module 1614 connects the binarized sequences, each of which contains only partial barcode information, into a concatenated sequence. There is overlap between two neighboring frames, due to the sufficient sampling rate of the image-capture device. There exists the maximum correlation when shift k is the correct number of overlapping bits, described as below, $$\underset{k}{\operatorname{argmax}} \sum Sq_1(i) Sq_2(k-i) \quad (4)$$

Where, $Sq_1$ and $Sq_2$ are two neighboring sequences and k is the shift.

In accordance with embodiments of the invention, formula (5) is used to compute the similarity of two sequences of two neighboring frames in k shift bits, and then find the value of k that maximizes r.

$$r = \frac{\sum_{i=0}^{n}[Sq_1(i+k) - \overline{S}q_1][Sq_2(i) - \overline{S}q_2]}{\left\{\sum_{i=0}^{n}[Sq_1(i+k) - \overline{S}q_1]^2 \sum_{i=0}^{n}[Sq_2(i) - \overline{S}q_2]^2\right\}^{1/2}} \quad (5)$$

Where, $Sq_1$ and Sq2 are two neighboring sequences, k is the shift, n is the overlap length of the two sequences.

Thus, the ID binary sequence of each frame is connected according to the shift information of neighboring frames.

IV.F. Sequence Matching

A barcode includes a certain number of modules, which are the most basic unit of a barcode. A module is the narrowest space and/or bar. After sequence matching, a whole binary sequence of bits is obtained. The barcode-module-determination module 1616 determines how many bits each module contains. Here, the start sentinel 100, the center guard bar 102, and the end sentinel 104 are used to help make this determination. For example, in accordance with a characteristic of barcodes, the encoded bits of the start sentinel 100, the center guard bar 102, and the end sentinel 104 may be "101", in which '1' and '0' are each a single module wide. In the decoding process, module images are re-sampled with super resolution and projected, so that any particular module may contain multiple bits. The barcode-module-determination module 1616 may determine a probable number of super-sampled bits per module by, for example, counting the number of sentinel and guard-bar super-sampled bits and then computing a mean value of super-sampled bits per module. Using this type of information, the bar sequence may be obtained. The bar sequence contains the module information and is graphically depicted in FIG. 14.

IV.G. Barcode Decoding

The barcode-decoding module 1618 may use coding rules to validate the correctness of the bar sequence and may then decode the barcode digits according to the type of barcode. Taking the EAN-13 barcode as an example, the correctness of the bar sequence is validated by 95-bits of module information using corresponding encoding rules and the digital information of the barcode may also be calculated.

It may be desirable to determine whether an input image series includes valid barcode information. Based on the character of a barcode, there are two criteria that may be used to make such a determination: strong orientation information that exists in the serial images 1602; and in each image, only one such strong orientation exists. Therefore, an effective judgment function may be implemented based on these features. Strong orientation information refers to objects in an image having almost the same direction. The gradient values of most pixels in a barcode image will drop into a relatively narrow orientation area. The gradient of an image may be computed. The Sobel operator may be used for such a computation. Then a gradient histogram may be calculated. Such a histogram will present an apparent peak value.

V. Concluding Remarks

What has been described above is merely illustrative of the application of the principles of the invention. Those skilled in the art can implement other arrangements and methods without departing from the spirit and scope of the invention. Any of the methods of the invention can be implemented in software that can be stored on computer disks or other computer-readable media.

We claim:

1. A system that decodes encoded barcode information from a camera-captured image, the system comprising:
    an image-processing module that generates a binarized sequence from the camera-captured image; and
    a binary-sequence processing module that decodes the encoded barcode information from the binarized sequence, wherein the binary-sequence-processing module includes a binary-sequence-recognition module that generates, from the binarized sequence, a barcode-encoding sequence in which each barcode bar module and each barcode space module is represented by a single respective bit in the barcode-encoding sequence.

2. The system of claim 1, wherein the image-processing module comprises an image-preprocessing module that transforms the camera-captured image into a preprocessed grayscale image, reduces noise in the preprocessed image, and enhances contrast between bars and spaces in the preprocessed image.

3. The system of claim 2, wherein the image-preprocessing module binarizes an image-binarization area that is located near a center of the preprocessed image.

4. The system of claim 1, wherein the image-processing module comprises a barcode-orientation-identification module that identifies a barcode orientation that is parallel to bars in the preprocessed image.

5. The system of claim 4, wherein the image-processing module comprises a barcode-image-projection module that generates a projected sequence by projecting pixels of the preprocessed image along the barcode orientation.

6. The system of claim 5, wherein the image-processing module comprises a sequence-binarization module that generates the binarized sequence by applying a threshold to detected peaks and valleys of the projected sequence.

7. The system of claim 1, wherein the binary-sequence-processing module comprises a barcode-decoding module that extracts the barcode encoded information from the barcode-encoding sequence.

8. A computer-readable medium having computer-executable instructions for decoding encoded barcode information from a camera-captured image by performing steps comprising:
    generating a binarized sequence from the camera-captured image;
    generating, from the binarized sequence, a barcode-encoding sequence in which each barcode bar module and each barcode space module is represented by a single respective bit in the barcode-encoding sequence; and decoding the encoded barcode information form the binarized sequence.

9. The computer-readable medium of claim 8, having further computer-executable instructions for transforming the camera-captured image into a preprocessed grayscale image, reducing noise in the preprocessed image, and enhancing contrast between bars and spaces in the preprocessed image.

10. The computer-readable medium of claim 9, having further computer-executable instructions for identifying a barcode orientation that is parallel to bars in the preprocessed image.

11. The computer-readable medium of claim 10, having further computer-executable instructions for generating a projected sequence by projecting pixels of the preprocessed image along the barcode orientation.

12. The computer-readable medium of claim 11, having further computer-executable instructions for generating the binarized sequence by applying a threshold to detected peaks and valleys of the projected sequence.

13. The computer-readable medium of claim 8, having further computer-executable instructions for extracting the barcode encoded information from the barcode-encoding sequence.

14. A system for decoding encoded barcode information from a camera-captured image, the system comprising:
   means for generating a binarized sequence from the camera-captured image;
   means for generating, from the binarized sequence, a barcode-encoding sequence in which each barcode bar module and each barcode space module is represented by a single respective bit in the barcode-encoding sequence; and
   means for decoding the encoded barcode information from the binarized sequence.

15. The system of claim 14, further comprising:
   means for transforming the camera-captured image into a preprocessed grayscale image;
   means for reducing noise in the preprocessed image; and
   means for enhancing contrast between bars and spaces in the preprocessed image.

16. The system of claim 15, further comprising:
   means for identifying a barcode orientation that is parallel to bars in the preprocessed image;
   means for generating a projected sequence by projecting pixels of the preprocessed image along the barcode orientation; and
   means for generating the binarized sequence by applying a threshold to detected peaks and valleys of the projected sequence.

17. The system of claim 14, further comprising means for extracting the barcode encoded information from the barcode-encoding sequence.

* * * * *